United States Patent
Kutkut et al.

(10) Patent No.: US 7,135,836 B2
(45) Date of Patent: Nov. 14, 2006

(54) MODULAR AND RECONFIGURABLE RAPID BATTERY CHARGER

(75) Inventors: Nasser H. Kutkut, Sun Prairie, WI (US); David Brobst, Chico, CA (US)

(73) Assignee: Power Designers, LLC, Madison, WI (US)

( * ) Notice: Subject to any disclaimer, the term of this patent is extended or adjusted under 35 U.S.C. 154(b) by 332 days.

(21) Appl. No.: 10/735,278

(22) Filed: Dec. 12, 2003

(65) Prior Publication Data

US 2004/0189251 A1    Sep. 30, 2004

Related U.S. Application Data

(60) Provisional application No. 60/458,816, filed on Mar. 28, 2003.

(51) Int. Cl.
    *H01M 10/44*    (2006.01)
    *H01M 10/46*    (2006.01)
(52) U.S. Cl. .................................... 320/116
(58) Field of Classification Search ................ 320/116, 320/117, 118, 120, 125, 137
    See application file for complete search history.

(56) References Cited

U.S. PATENT DOCUMENTS

| | | | |
|---|---|---|---|
| 5,565,756 A | 10/1996 | Urbish et al. | |
| 5,617,004 A | 4/1997 | Kaneko | |
| 5,631,536 A | 5/1997 | Tseng | |
| 5,780,991 A | 7/1998 | Brake et al. | |
| 6,018,227 A | 1/2000 | Kumar et al. | |
| 6,150,795 A | 11/2000 | Kutkut et al. | |
| 6,177,780 B1 | 1/2001 | Roy et al. | |
| 6,291,972 B1 * | 9/2001 | Zhang | 320/118 |
| 6,297,616 B1 * | 10/2001 | Kubo et al. | 320/116 |
| 6,664,762 B1 * | 12/2003 | Kutkut | 320/116 |
| 2003/0038612 A1 * | 2/2003 | Kutkut | 320/140 |

* cited by examiner

*Primary Examiner*—Edward H. Tso
(74) *Attorney, Agent, or Firm*—Foley & Lardner LLP

(57) ABSTRACT

The battery charger is modular and reconfigurable. It includes charging modular power stages that are configured to receive an alternating current (AC) input and provide a direct current (DC) output for charging a battery. These modular power stages include an inverter coupled to a rectifier circuit that outputs a battery charging current. The modular power stages can also each include a current mode controller coupled to the output of the rectifier circuit and configured to provide a current control signal for the modular power stage, a voltage mode controller coupled to the output of the rectifier circuit and configured to provide a voltage control signal for the modular power stage, and a droop sharing control and configured to ensure current sharing between a plurality of modular power stages under constant voltage operation. A system controller is configured to interface with the modular power stages.

22 Claims, 17 Drawing Sheets

MODULAR AND RECONFIGURABLE RAPID BATTERY CHARGER

CROSS REFERENCE TO RELATED APPLICATIONS

The present application claims priority to U.S. Provisional Application 60/458,816 entitled "Modular and Reconfigurable Rapid Battery Charger" filed on Mar. 28, 2003, and incorporated herein in its entirety by reference.

FIELD OF THE INVENTION

This invention pertains generally to the field of battery charging and particularly to rapid battery charging systems.

BACKGROUND OF THE INVENTION

In general, battery charging is a complex electrochemical process in which the discharged electric energy must be replenished from an electric network. The quality of the charging process is critical to the health and longevity of batteries. As such, battery chargers need to be fitted with advanced controls to optimize charging and prolong battery life.

Conventional battery charging is done at low rates that return 60% to 70% of the battery's discharged energy within 6 hours, which brings the battery to about 80% to 90% state of charge (SOC). This is followed by an even lower rate of charge to bring the battery to 100% SOC in two to four hours. In total, a conventional charge cycle typically lasts 8 to 10 hours.

Rapid or fast charging is a new charging scheme that attempts to shorten the recharge time of batteries. Rapid charging greatly reduces the time it takes to bring the battery to a SOC of 80% to two hours or less. This reduction in time is accomplished by charging at a higher rate compared to conventional charging. While conventional charging recharges the battery at a rate of less than 10% to 15% of the amp-hour rating of the battery, rapid charging recharges the battery at a rate greater than 40%, resulting in more than a three-fold reduction in recharge time.

Rapid battery charging systems have been developed and are being offered by a number of manufacturers. However, these rapid charging systems have a number of drawbacks and limitations that have resulted in limited customer acceptance and penetration in the market place.

As a first example of the limitations of known rapid changing systems, most of these chargers are offered in a single power rating, namely 30 kW, 45 kW, or 60 kW. As such, customers with less than 30 kW power requirements, e.g. 10 kW or 20 kW, will have to pay extra for a higher power charging system (30 kW), that they will not be fully utilizing. In addition, customers with a 40 kW or 50 kW requirement settle for lower or higher rated battery chargers, namely 45 kW or 60 kW. This tradeoff makes such chargers more expensive from a customer perspective.

As a second example, all of these charging systems are non-modular and non-reconfigurable. As such, if a user's power needs increase at some point of time, the user would have to buy a new higher power charger to meet such need because the existing charger cannot be easily reconfigured for higher power operation.

As a third example, some of these charging systems support multiport operation but require extensive and complex installations as well as considerable infrastructure expenses, which must be covered by the customers. Typically, a conventional multiport charger consists of a central power server 10 along with a number of charging stations 11 as shown in FIG. 1. The multiport rapid charging system of FIG. 1 requires two levels of power conversion and control. The first is a main power server 10, which processes the AC power from the mains into distributed DC power, while the second are DC/DC charging ports 11 that charge individual battery powered systems (e.g., battery powered vehicles illustrated at 13 in FIG. 1).

FIG. 2 shows a block diagram of a typical multiport rapid charging system. In the conventional multiport charging system shown in FIG. 2, the main power server 10 can receive power from AC power lines at a 60 Hz transformer 14 which provides lower voltage AC power to an AC/DC converter 16. The converter 16 can be implemented in various ways, such as a passive rectifier followed by a DC/DC converter or as an active SCR rectifier. The converter 16 is controlled by a controller 18 through a gate drive and control 19. The DC output voltage from the converter 16 is applied to DC bus lines 20 that supplies DC power to the individual charging ports 11. Each of the charging ports 11 includes a DC to DC post regulator 22 and an output filter 23, with control being provided by a microprocessor and user interface 24 which receives signals indicating the output voltage and current from sensors 27 and which provides control signals to the regulator 22 through a gate drive and control circuit 28. The main system controller 18 also communicates with the microprocessor controller 24 in each of the individual ports 11 to provide overall system control. If rapid charging is to be available at all charging ports, the rating of the main power server must be quite high. If, however, the rating of the main power server 10 is limited, rapid charging will have to be trimmed when more battery powered systems, such as the vehicles 13, are charged simultaneously. In either case, the complexity and the cost of installing such charging systems are considerable.

SUMMARY OF THE INVENTION

The battery charger of the present invention is modular, reconfigurable to provide user selectable output power capabilities, and capable of flexible multiport rapid charging with reduced charger complexity and installation costs. The modular rapid charger system includes low power charging base modules that can be paralleled to provide higher power charging if necessary. A central system level controller interfaces with each of the base modules through a central communications bus. The system level controller includes the user interfaces and implements the charging algorithms. Each base module includes a high efficiency switch mode power converter with high frequency isolation. The rating of the base module is determined based on the level of configurability required to meet the power demands of various users. For example, a 10 kW base module allows users to assemble a rapid charging system having a power output as low as, e.g., 10 kW with one module, as well as assembling higher powered chargers in 10 kW increments, for example, 20 kW, 30 kW, 40 kW, 50 kW, and so on.

The rapid charging system of an exemplary embodiment resolves several of the limitations and drawbacks of existing rapid chargers. In addition to allowing assembly of a system of chargers to meet specified power requirements of the user, where multiple charger modules are utilized, the redundancy of the multiple modules allows charging to continue even if one module fails. In contrast to a single charging station, the failure of one module will not require charging to completely stop, inasmuch as the remaining modules can still furnish energy to the. battery. This is a significant advantage in industrial settings where downtime is very costly. The charging system of the invention can reconfigure itself such that when the rapid charging system is turned on, the main controller can determine how many power modules are available and set the system power rating based on that information.

Because the system is modular and reconfigurable, as the power needs of a user increases, additional power modules can be added to the system to expand the power capacity of the system rather than requiring the installation of an entire new system.

The modular rapid charging system can be conveniently implemented using a rack based design approach. The base modules can be housed in a rack mounted package utilizing a rack with multiple bays in which the system level controller as well as each of the base modules is mounted.

Further objects, features and advantages of the exemplary embodiments will be apparent from the following detailed description when taken in conjunction with the accompanying drawings.

DETAILED DESCRIPTION OF THE INVENTION

Figure 3:
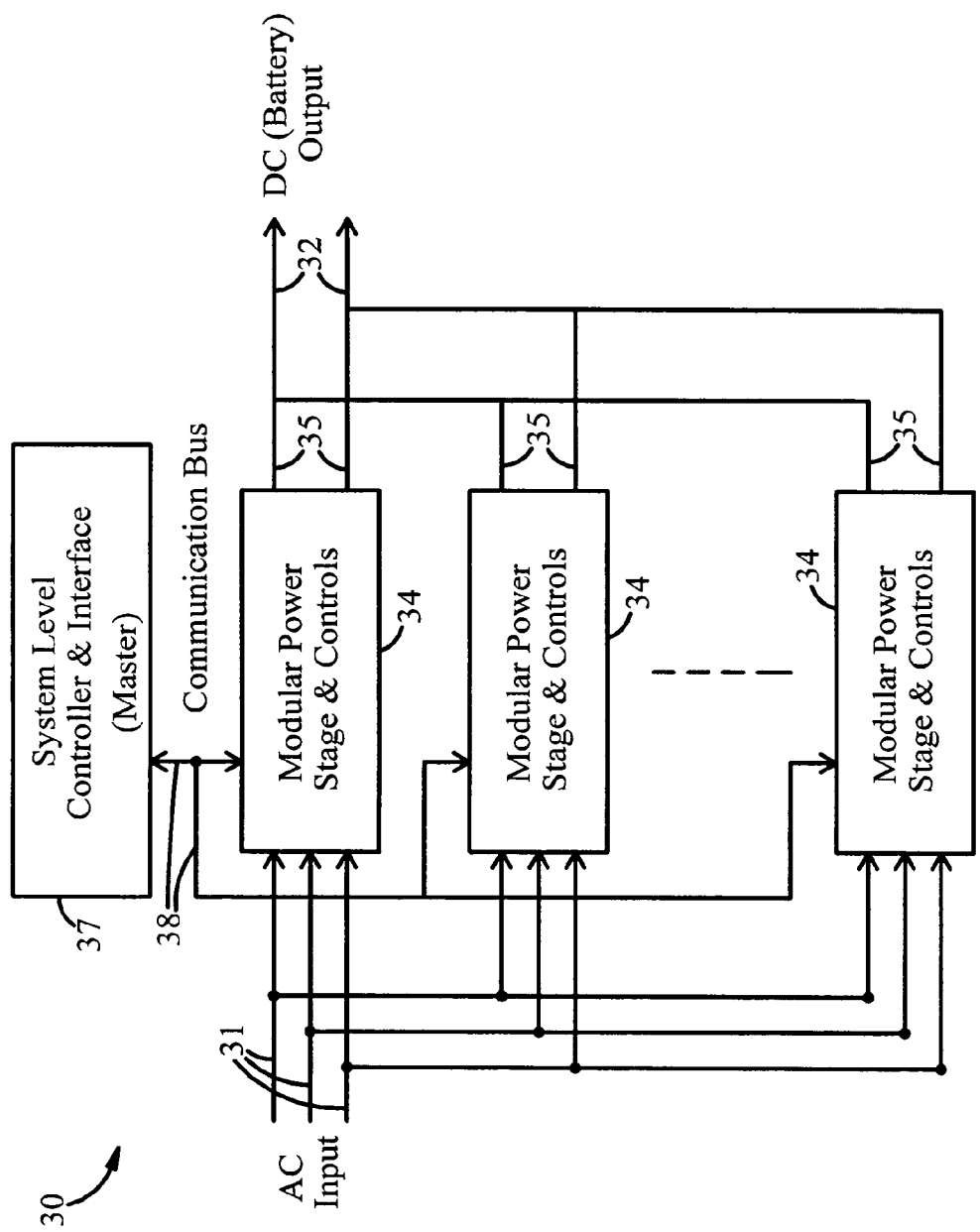
FIG. 3 is a block diagram of the modular rapid charging system of an exemplary embodiment.

With reference to the drawings, a modular rapid charging system in accordance with the invention is shown generally at 30 in FIG. 3. The modular rapid charging system 30 receives AC input power on input lines 31 and provides DC charging power to a battery (not shown) on output lines 32. The system 30 includes one or more base power modules 34 which each are connected in parallel to receive power from the input lines 31, with each of the power modules 34 having DC output lines 35 which may be directly connected in parallel with each other and to the output lines 32. A system level controller and interface 37 is connected to each of the base modules 34 via a communications bus 38. Each of the base modules 34 is a stand-alone unit which can, by itself, provide battery charging at the specified rating of the module. For example, each of the modules 34 may have a relatively basic power rating, e.g., 10 kW, which may be sufficient by itself for certain types of charging applications. Nonetheless, if a higher power output is required, for example, 50 kW, five of the base modules 34 may be utilized with their outputs connected in parallel to the output lines 32 to effectively provide a 50 kW charging system. The system level controller 37 coordinates the actions of the several modules 34 to provide the desired charging sequence for the power provided on the output lines 32 to the battery, e.g., a rapid initial charge.

Figure 1:
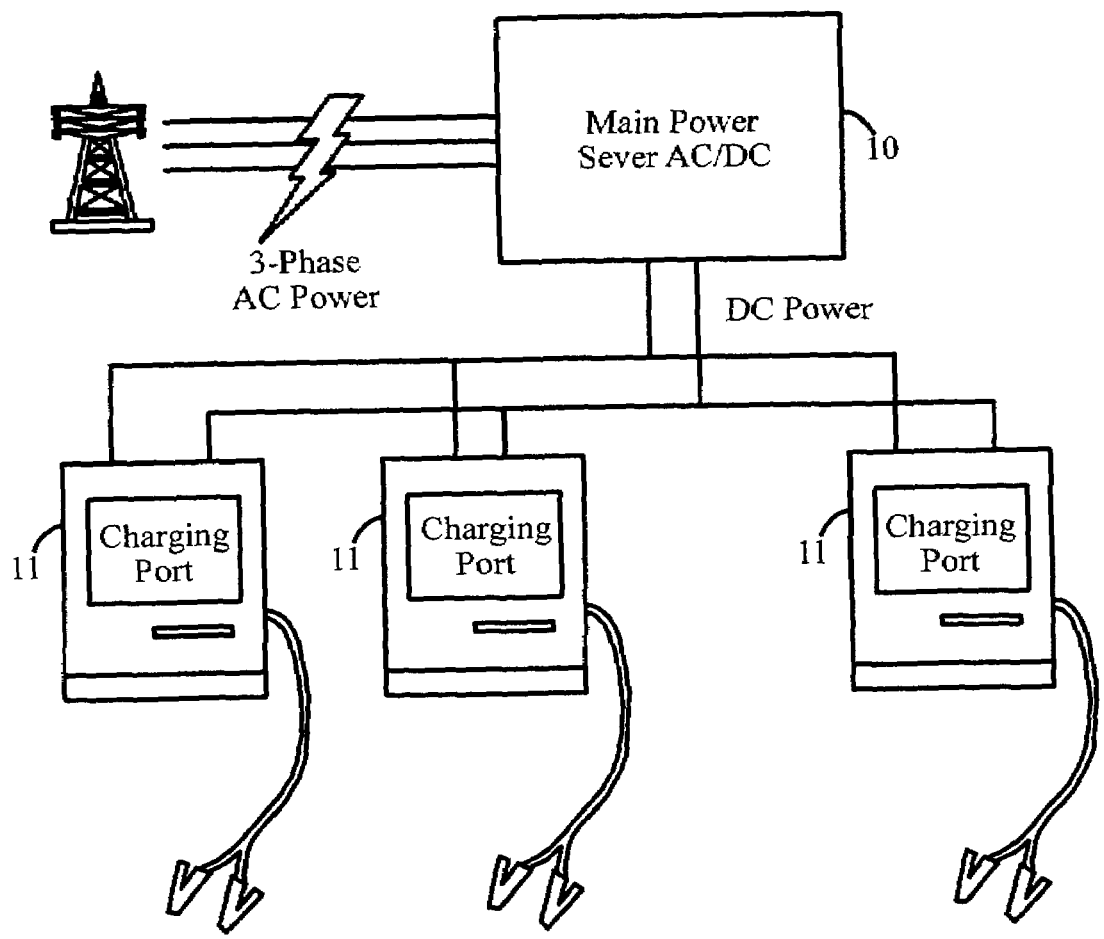
FIG. 1 is an illustrative view of a typical conventional multiport rapid charging system.
Figure 2:
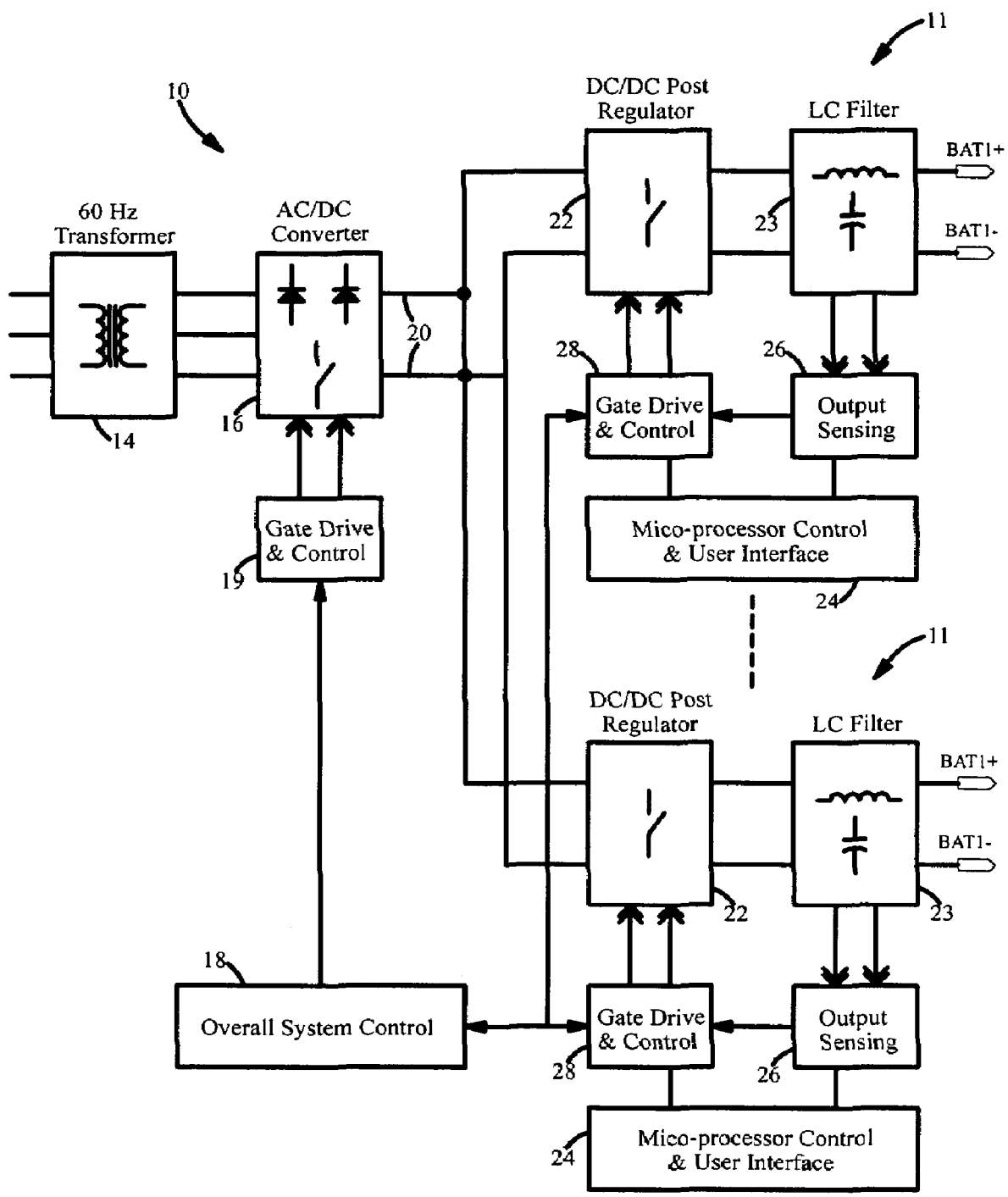
FIG. 2 is a block diagram of a conventional multiport rapid charger.
Figure 4:
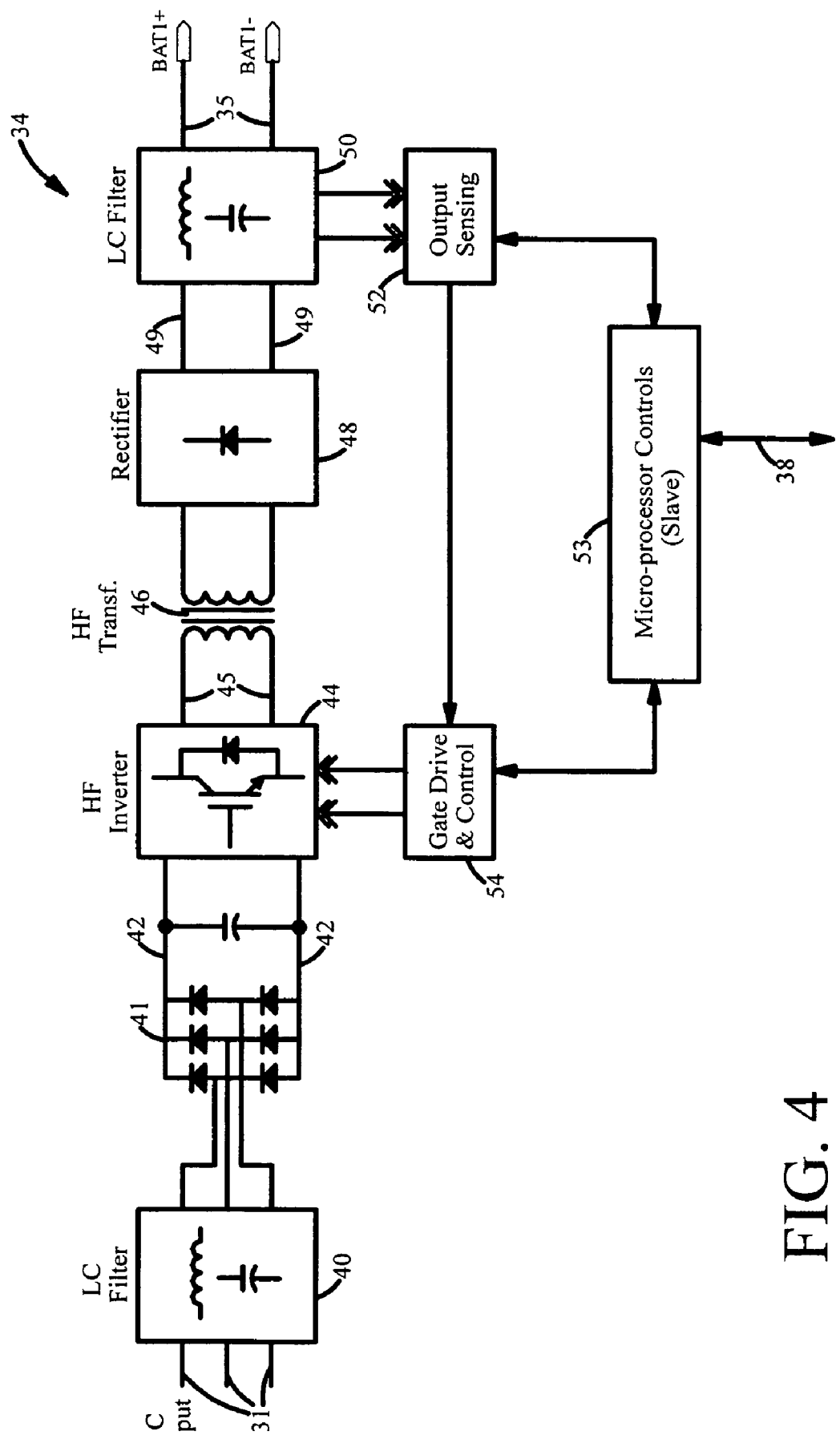
FIG. 4 is a block diagram of a base power module of the rapid charging system of an exemplary embodiment.

A block diagram of a preferred embodiment of a base power module 34 is illustrated in FIG. 4. The AC power on the input lines 31 is provided through a filter 40 to a rectifier 41 which provides DC power on lines 42 to a high frequency inverter 44. A DC bus capacitor 43 is connected across the DC bus lines 42. The rectifier 41 is shown as a diode bridge for exemplification, but any AC/DC converter may be utilized to provide the DC voltage on the lines 42. The high frequency inverter 44 may operate to invert the DC power to a high frequency AC power (e.g., at 20 kHz or higher, such as 70 kHz) on output lines 45 through a high frequency transformer 46 to a rectifier 48. Because the AC power is at a high frequency, a much smaller and less expensive transformer 46 may be used than is required for a 60 Hz transformer such as in a conventional charging system as shown in FIG. 2. The DC output of the rectifier 48 on output lines 49 is filtered by a filter 50 to provide the DC charging current on the output lines 35. Although the high frequency link through the transformer 46 is preferred, it is understood that the module 34 may be implemented in appropriate applications in other AC/DC converter configurations. Output sensors 52 are connected to monitor the output power provided to the output lines 35 and communicate with a microprocessor 53 within the base module 34 that also provides control signals to a gate drive and control circuit 54 that provides the gate drive signals to the switching devices in the inverter 44. The base module microprocessor controller 53 communicates via the communications bus 38 with the system level controller 37.

Figure 5:
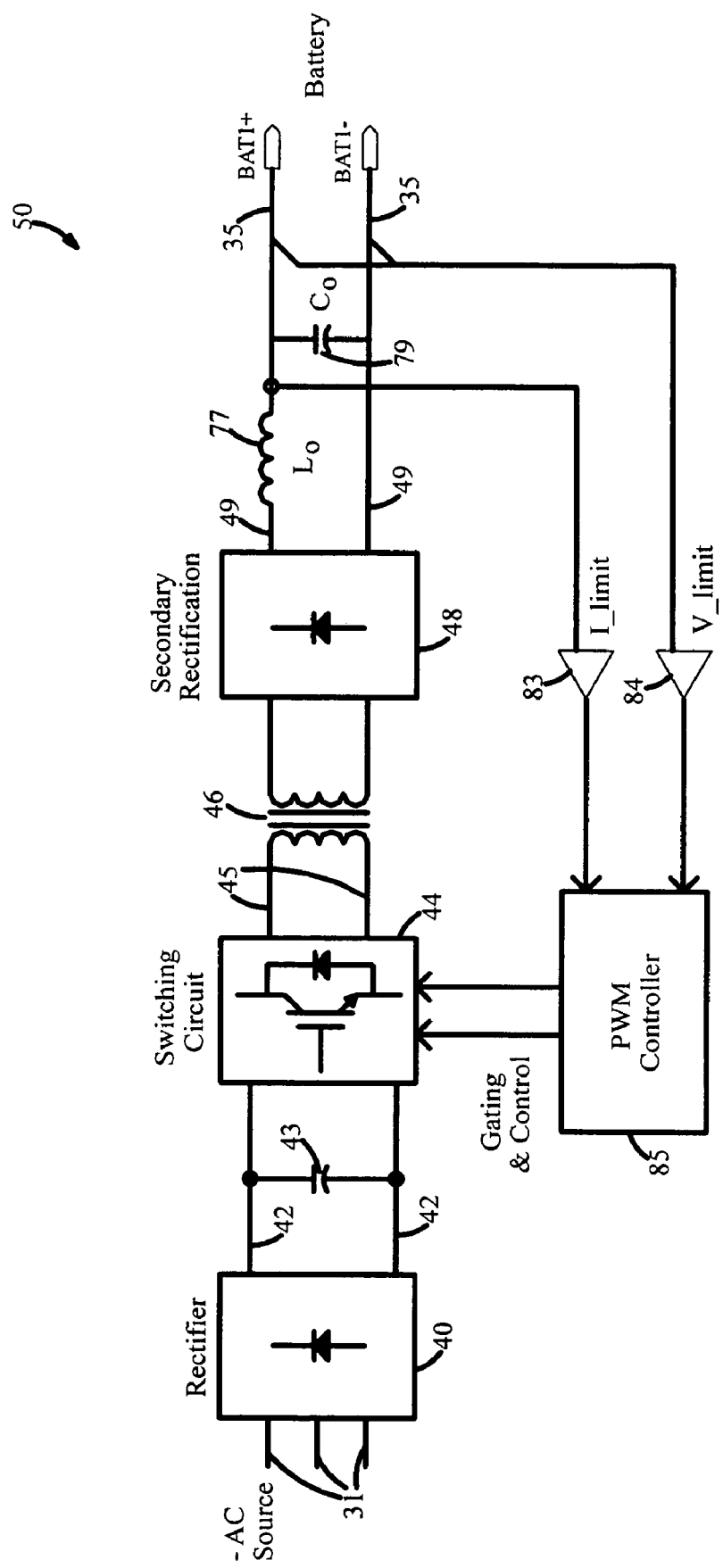
FIG. 5 is a block diagram of a typical buck-based topology with an inductive output filtering stage in accordance with an exemplary embodiment.

Base modules 34 can be implemented using a variety of different configurations or topologies. For example, FIG. 5 illustrates an exemplary isolated buck-based power converter topology for the base modules 34 having an inductive output filtering stage along with corresponding sense and control blocks to implement constant current and constant voltage charge methods. The AC power on the input lines 31 is provided through the rectifier 40 which provides DC power on lines 42 to an inverter 44. The inverter 44 provides AC power on the output lines 45 through a high frequency transformer 46 to the rectifier 49. The output of the rectifier 46 on the lines 49 is filtered by a filter 50 composed of a series inductor 77 and a shunt capacitor 79 to provide charging current on the output lines 35. Amplifiers 83 and 84 are connected to monitor the current and voltage, respectively, on the lines 35 (receiving current and voltage limit reference inputs) and communicate with a pulse width modulator (PWM) controller 85. Due to the requirement for parallel operation of the base power modules, a buck-based topology allows for easy implementation of current sharing between the parallel-connected base modules 34 as shown in FIG. 3.

Figure 6:
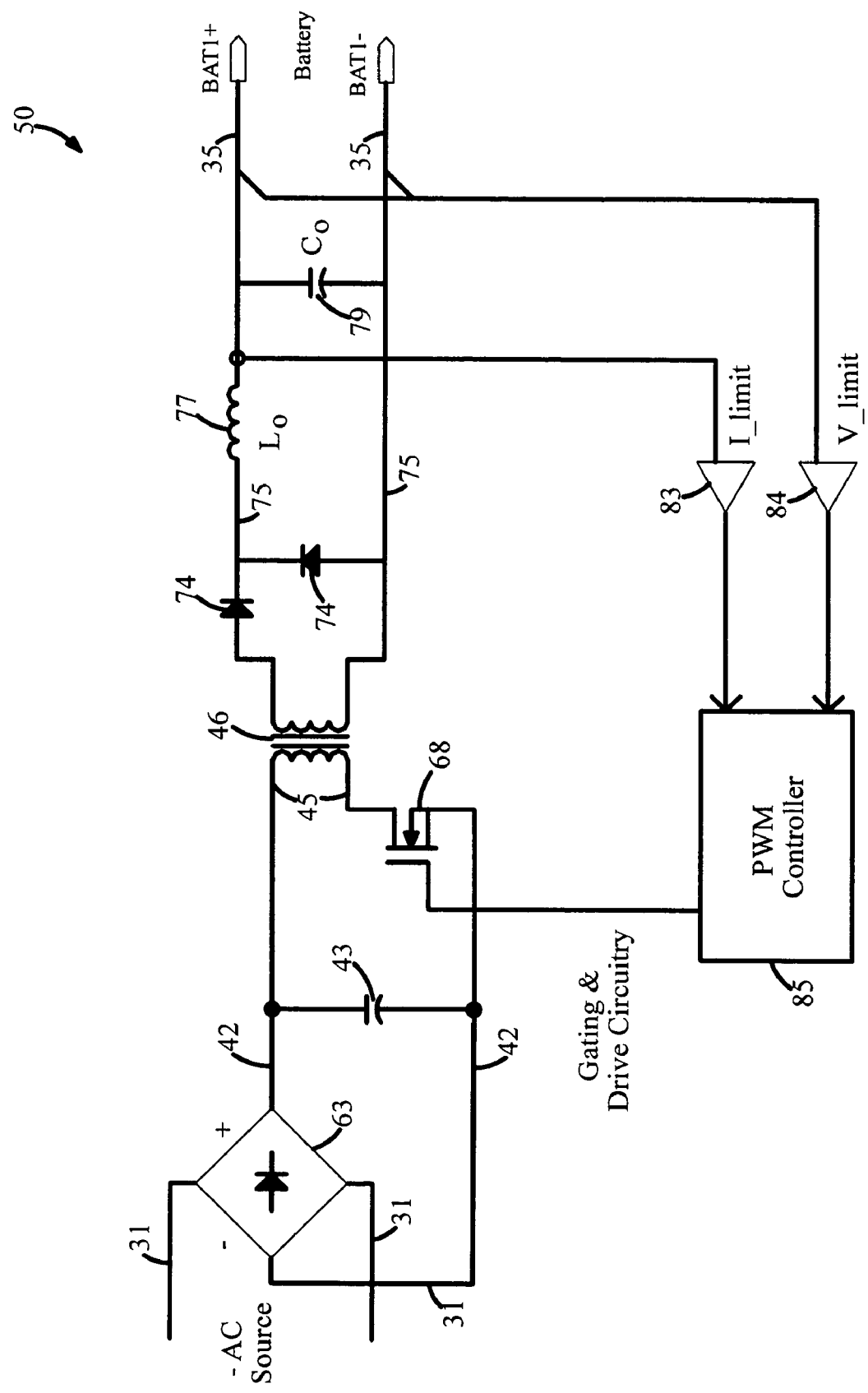
FIG. 6 is a block diagram of a single switch buck-based forward converter in accordance with an exemplary embodiment.

FIG. 6 illustrates a single switch forward converter configuration for the base modules 34. For low power battery charging needs (e.g., <1 kW), single switch and two switch forward converters provide simple isolated buck-based battery charger topologies. In the exemplary single switch forward converter configuration of FIG. 6, the inverter 44 is formed of a single gate controlled switch 68 (e.g., a power MOSFET) connected in series with the primary of the transformer 45 across the DC bus lines 42, and the rectifier 49 is implemented using two diodes 74. Other components in the configuration are the same as those described with reference to FIGS. 4 and 5.

Figure 7:
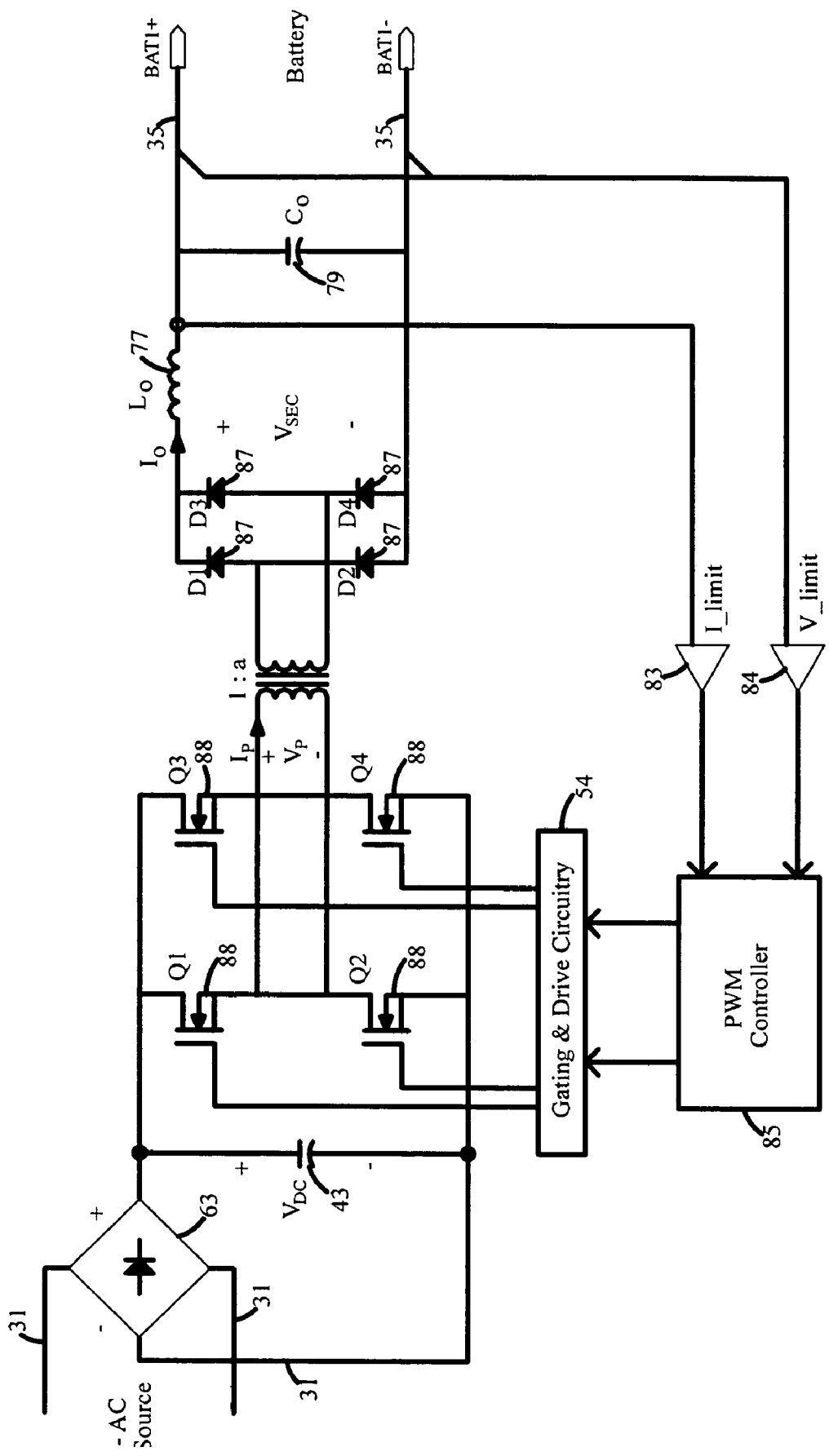
FIG. 7 is a block diagram of a full-bridge buck-based power converter with full wave rectifier in accordance with an exemplary embodiment.

FIG. 7 illustrates a full-bridge converter for the base modules 34. For high power charging needs (e.g., >1 kW), a full-bridge converter with an inductive output filter is a suitable power converter topology. In an exemplary full-bridge converter configuration, four gate controlled switches 88 are used in an H-bridge as the inverter 44 and a full wave rectifier 48 is formed of four diodes 87 connected in a full bridge. A center-tapped (push-pull) rectifier may also be used as the full wave rectifier 48.

Figure 8:
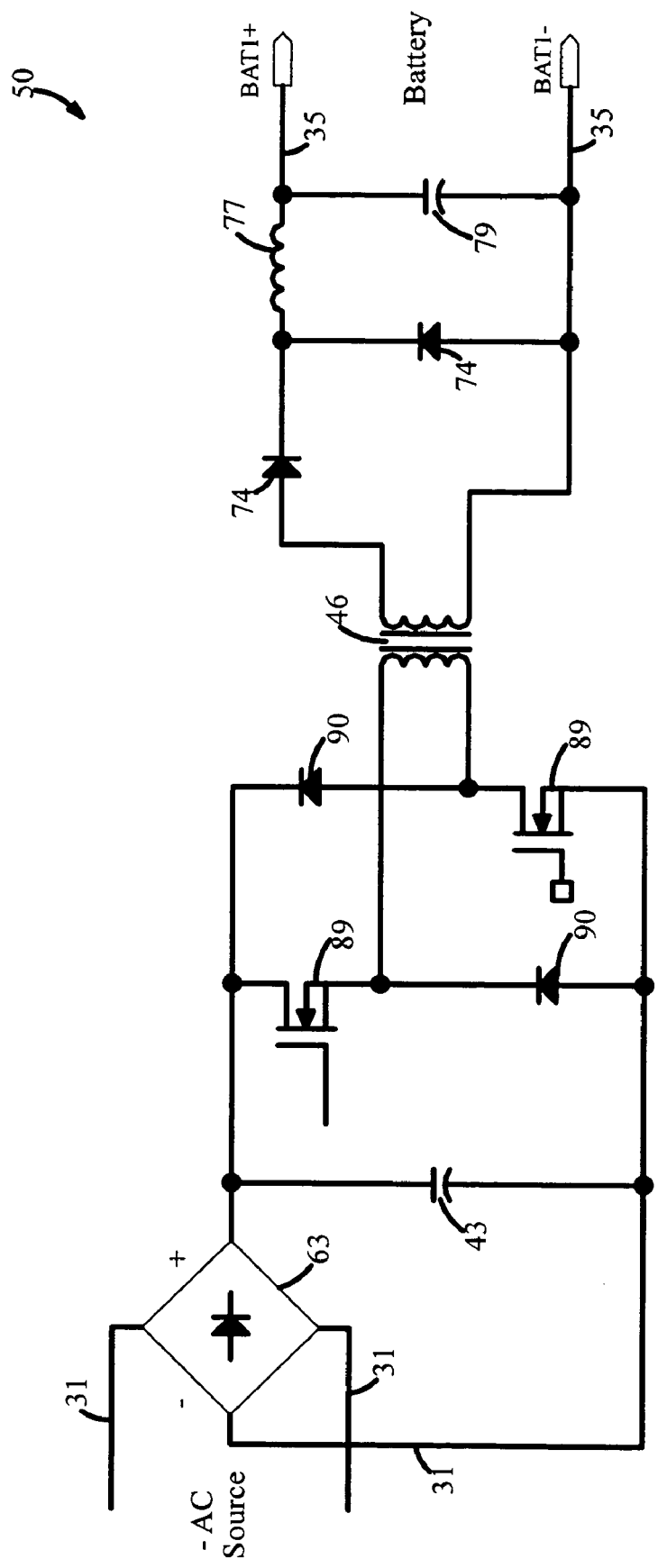
FIG. 8 is a block diagram of two-switch forward buck-based topology in accordance with an exemplary embodiment.
Figure 9:
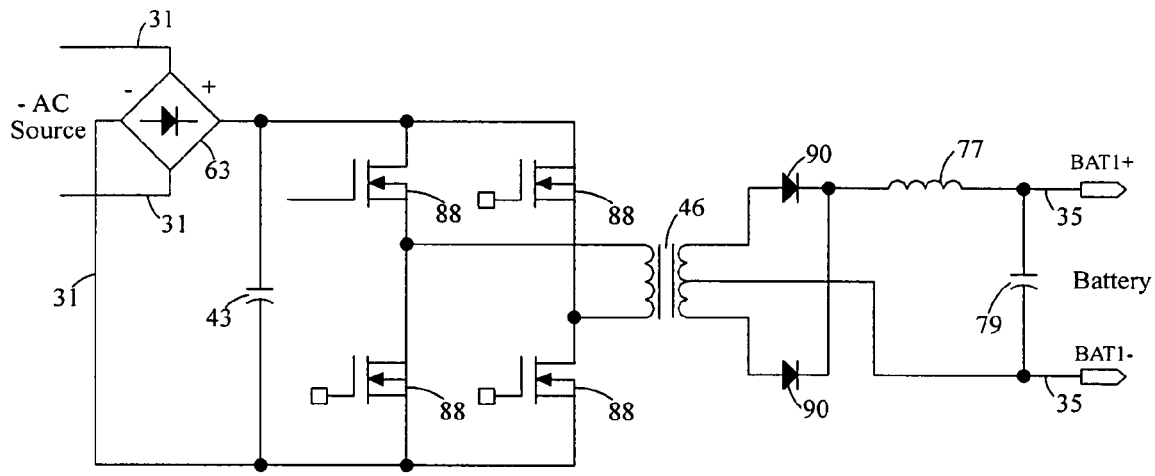
FIG. 9 is a block diagram of full-bridge buck-based topology with push-pull rectifier in accordance with an exemplary embodiment.
Figure 10:
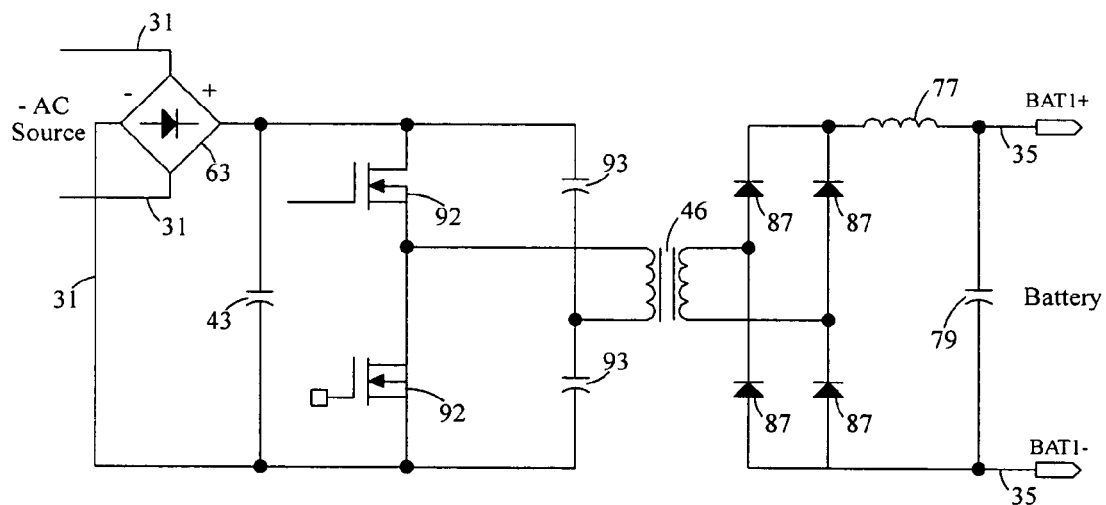
FIG. 10 is a block diagram of half-bridge buck-based topology in accordance with an exemplary embodiment.
Figure 11:
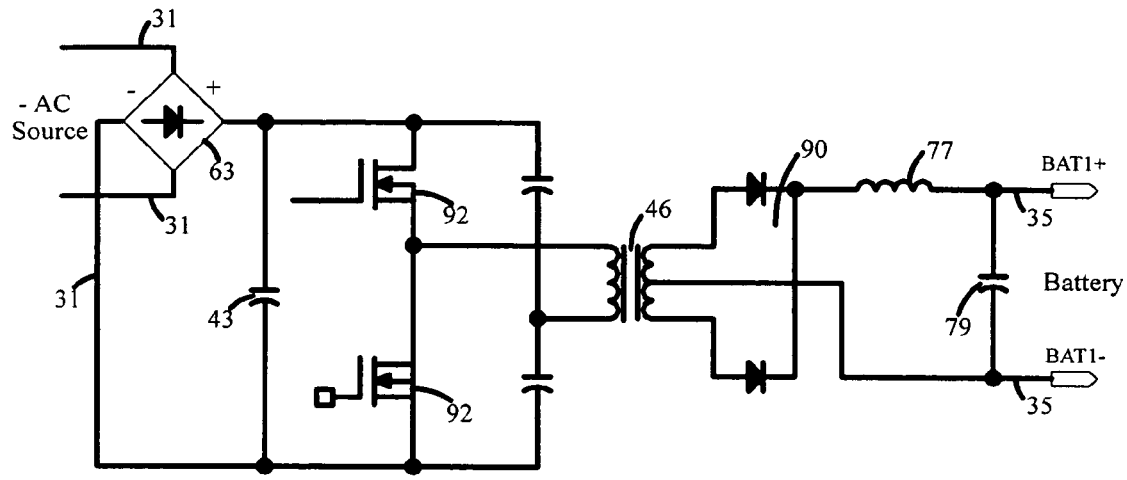
FIG. 11 is a block diagram of half-bridge buck-based topology with push-pull rectifier in accordance with an exemplary embodiment.

Other buck-based topologies can also be used for the base modules 34. For example, FIG. 8 illustrates a two-switch forward converter configuration for the base modules 34. In this configuration, the inverter 44 is implemented using two switches 89 in two arms of a bridge and two diodes 90 in the other arms of the bridge, and the rectifier 48 is implemented using two diodes 74 in a forward converter configuration. FIG. 9 illustrates a full bridge converter with a push-pull rectifier configuration for the base modules 34. In this configuration, four switches 88 are used in an H-bridge in the inverter 44 and a push-pull rectifier formed with a center tapped transformer and two diodes 90 is used for the rectifier 48. FIG. 10 illustrates a half-bridge converter with a full bridge rectifier configuration for the base modules 34. In this configuration, two switches 92 are used as a half bridge with capacitors 93 in the inverter 44, and a full wave rectifier composed of a full bridge of diodes 87 is used as the rectifier 48. FIG. 11 illustrates a half-bridge converter with a push-pull rectifier configuration with a center tapped transformer and two diodes 90 for the base modules 34.

Figure 12:
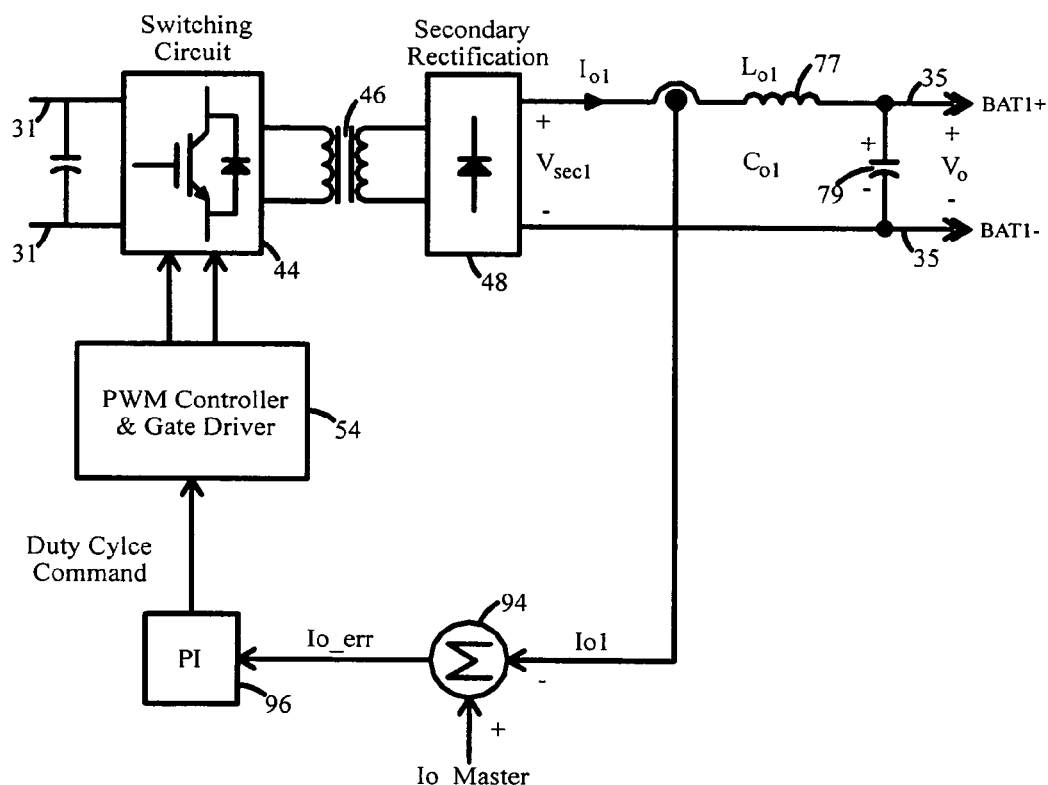
FIG. 12 is a block diagram of a typical current mode control block diagram in accordance with an exemplary embodiment.

FIG. 12 illustrates a control mode control block diagram for a buck-based converter topology used for the base modules 34. The base power modules 34 are parallel connected to realize higher output currents and power. As such, the output voltage of all modules is common while the output current is the sum of all parallel-connected charging modules' currents. To ensure equal current contribution by all modules, current mode control can be employed. Under constant current mode control (constant current charging) each module 34 regulates its output current based on a master command set by the master controller and delivers the same amount of current to the battery.

The current mode controller shown in FIG. 12 includes a current feedback signal, Iob, that is subtracted from a master current command, Io_Master, which is set by the master controller 37 as shown in FIG. 3, to generate the current error signal Io_err. The subtraction can be implemented using an adder 94 (e.g. a summing amplifier). A Pi (proportional-integral) network 96 is used to null the current error and generate the corresponding PWM commands to the PWM controller 54.

Figure 13:
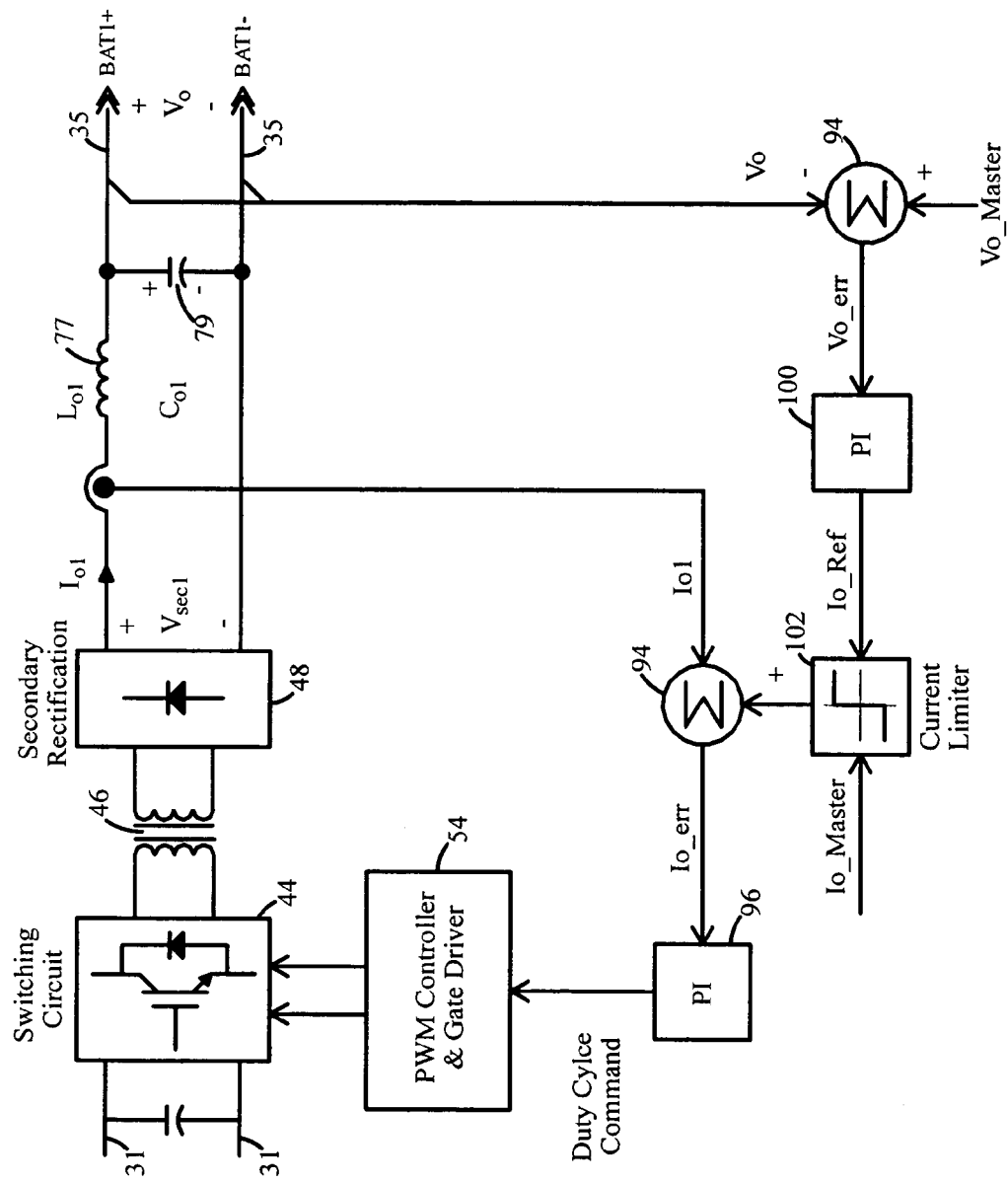
FIG. 13 is a block diagram of a buck-based converter with voltage and current mode controls in accordance with an exemplary embodiment.

FIG. 13 illustrates a buck based converter with voltage and current mode commands. A voltage mode controller is needed to regulate the battery voltage under constant voltage operation. An exemplary embodiment includes an inner current loop and an outer voltage loop. The outer voltage loop includes a voltage feedback signal Vo, which is subtracted from a master voltage command Vo_Master that is set by the master controller 37 (FIG. 3) to generate the voltage error signal Vo-error. This subtraction can be implemented using an adder 98. A Pi network 100 is used to null the voltage error and generate a current reference command, Io_ref, for the inner current loop. In order to implement the constant current charging method, current limiter circuitry 102 is used, where the maximum current command, Io_ref, is capped at Io_Master. If the current command, Io_ref, is lower than Io_Master the charger will be in constant voltage mode. On the other hand, if the current command, Io_ref, is higher than Io_Master the charger will be in constant current mode. A PI network 96 is used as part of the current loop to regulate the charger current to the desired level. A PWM and gate drive controller 54, such as the UC3525 PWM control IC by Texas Instruments, can be used to generate the required PWM control and gate drive levels to drive the power devices.

Figure 14:
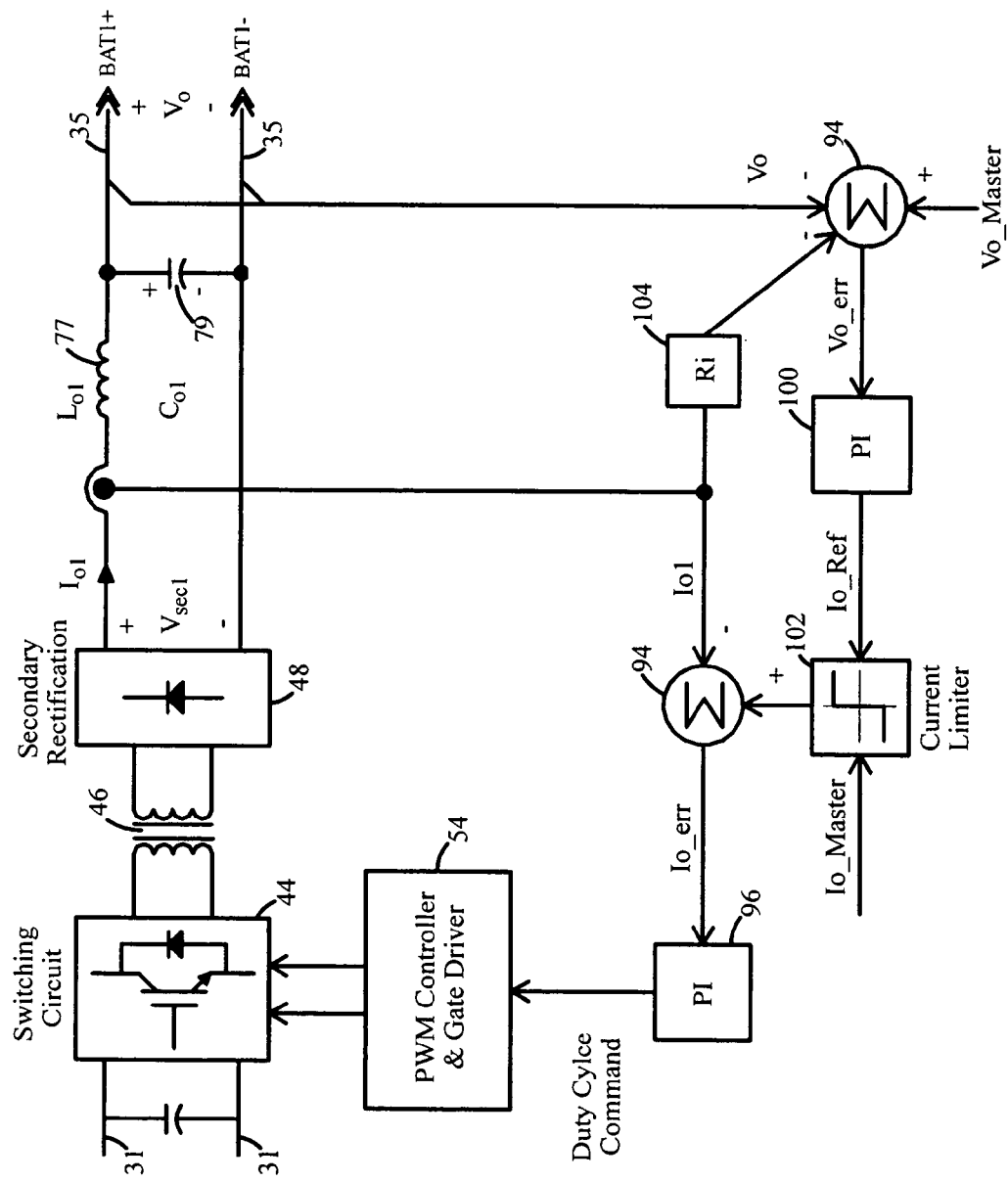
FIG. 14 is a block diagram of a buck-based converter with voltage and current mode controls as well as droop sharing control in accordance with an exemplary embodiment.

FIG. 14 illustrates a buck based converter with voltage and current mode controls as well as droop sharing control. Droop sharing control is used to ensure current sharing between modules under constant voltage operation. In an exemplary implementation, droop sharing is an open loop technique, which programs the output impedance of the power converter to obtain load sharing. With this method, current sharing is poor at low output currents and improves significantly at higher currents. Droop sharing can be implemented using a resistor 104 to program the output impedance of the charger. As the individual charging module current increases, the feedback voltage will decrease by $Ri \times I_{o1}$, which will cause other modules to contribute more current. The impedance gain Ri sets the amount of droop that the circuit can implement. A 5% droop criteria can be used to compensate for component and layout variations between the parallel-connected modules.

Other current sharing methods that employ a current share bus, which interconnects all modules, can be also used. These include the highest current and average current methods. An example is the UC 3907 control IC from Texas Instruments that implements various current sharing techniques for parallel-connected power converters. (See http://focus.ti.com/lit/ds/symlink/uc3907.pdf).

Figure 15:
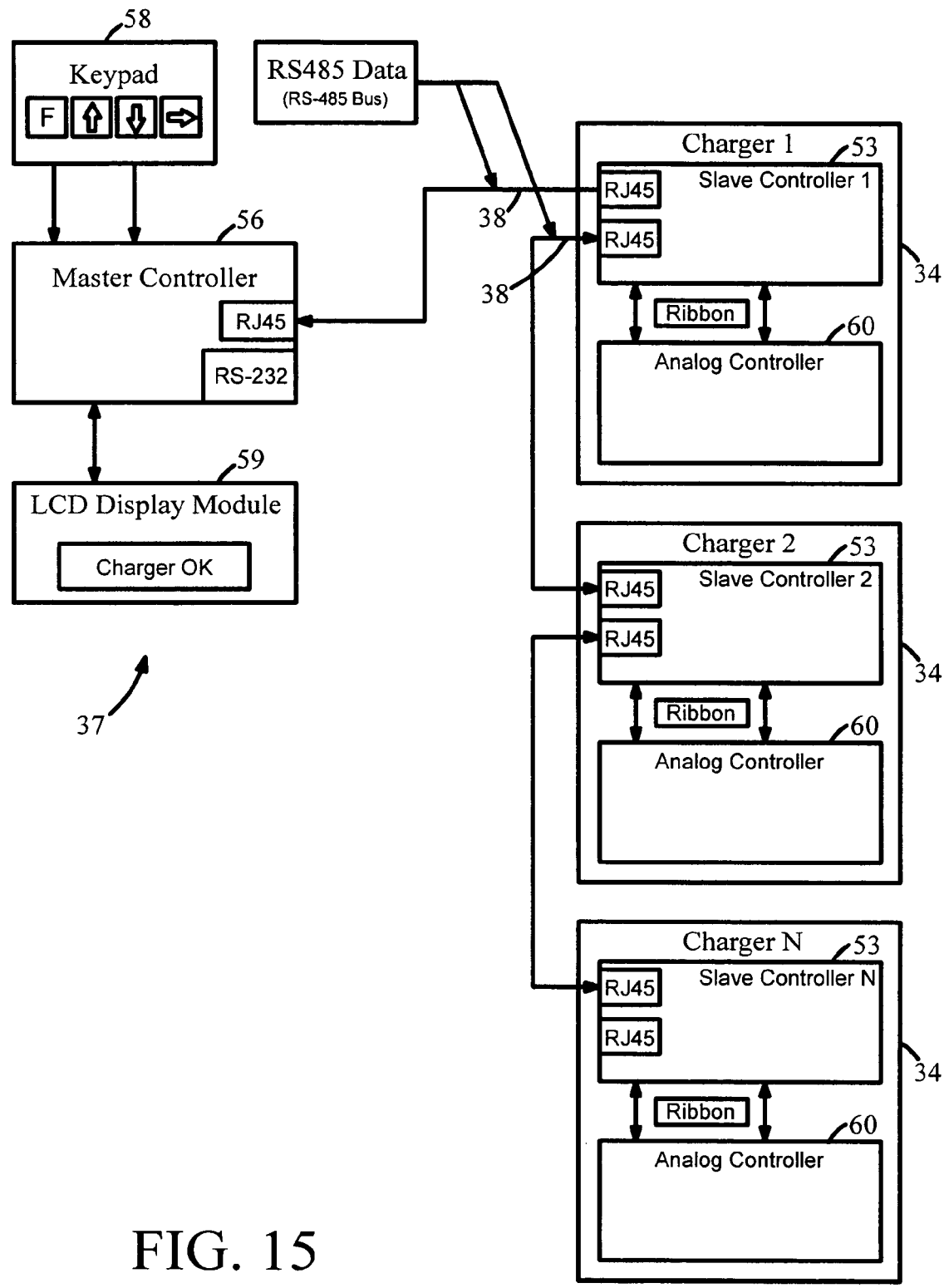
FIG. 15 is a block diagram of the charger system of an exemplary embodiment illustrating master-slave charger control implementation using an RS-485 bus.

As illustrated in FIG. 15, the central controller 37 may consist of a microprocessor master controller 56 that communicates with each of the respective microprocessor controllers 53 (slaves) in the base modules 34. An isolated communications bus is used to establish communication between the master and slave controllers, an example of which is RS-485, although other communications protocols, such as CAN, may also be used. FIG. 15 shows a typical implementation of the master-slave charger controller using a RS-485 bus. The communication bus can be realized using standard Ethernet cables (CAT 5) and RJ45 connectors. In a preferred implementation of the system, the master controller 56 performs several tasks. These include providing user interface through a keypad 58 and LCD display 59, or other standard serial interface protocols (e.g., RS-232, RS-485, Ethernet); implementing the charger control algorithms by commanding voltage and current setpoints to all of the base module chargers; initiating and managing communications with all other slave controllers 34; enabling and disabling the individual base module chargers; and autoconfiguring the overall charging system power and current ratings.

Each of the slave microprocessor controllers 53 perform several tasks, including enabling their respective charging module and setting the voltage and current commands as instructed by the master controller; communicating voltage and current feedback to the master controller; and interrupting the charging of their charger module if a fault occurs, and communicating the fault status to the master controller.

Figure 16:
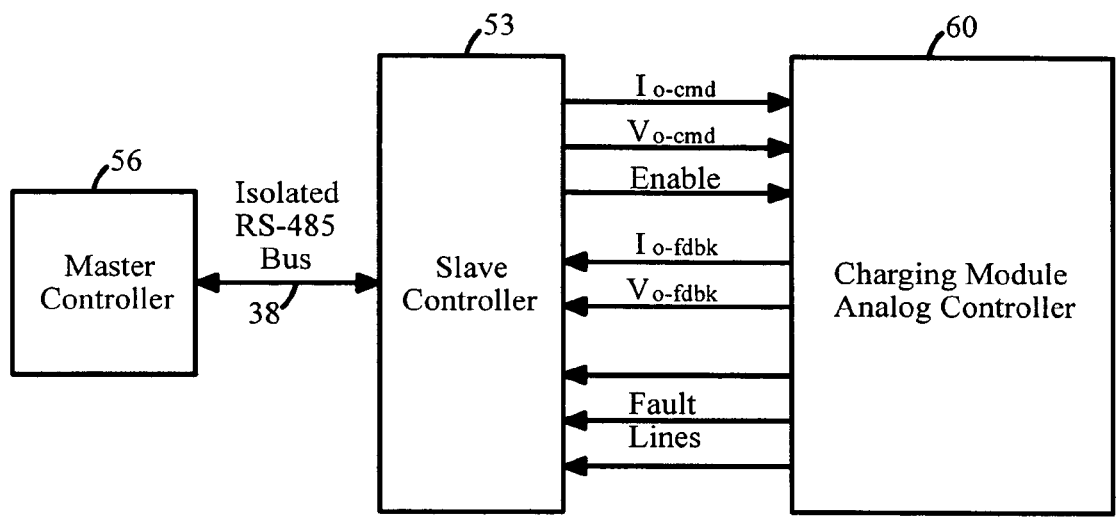
FIG. 16 is a block diagram of a slave-analog controller interface that may be utilized in an exemplary embodiment.

A typical slave controller 53 interfaces with the charger analog controller 60 as shown in FIG. 16. In its simplest implementation, the slave controllers 53 enable their respective chargers (ENABLE command), set the voltage and current commands (Io-cmd, Vo-cmd), and communicate the voltage and current feedback signals (Io-fdbk, Vo-fdbk), as well as any faults (FAULT LINES), to the master controller. Charger faults may include output over-current, output over-voltage, over-temperature, and input AC line faults.

In the preferred implementation, the master and the slave controllers communicate over a half-duplex RS-485 serial communications channel. The RS-485 channel is isolated to ensure protection for end users who may interface with the master controller as well as provide the proper voltage level shifting between the various charging units.

Since the charging base modules' controllers 53 are slaves, they do not initiate communication. All communication originates with the master controller 37. However, both the master and the slave units are capable of being both senders and receivers within the same communication sequence. Each slave controller 53 has a unique address so that the master can query each slave controller individually without other slaves stepping on the communication. The address of the slave controllers can be set using dip switches that can be programmed to set a given address.

In addressing a specific slave controller 53, the master controller 37 may use a specific bit in the communication packet to alert all slave controllers to listen to the master and watch for their respective addresses. For example, if the 8th bit is used for this purpose, any byte that has the 8th bit set is an address command that causes all slave controllers to listen to the master to check if they are being addressed. Once a slave controller is addressed, it receives all bytes until the communication packet from the master is finished, and then it responds in-kind. Non-addressed slave controllers ignore all bytes they receive which do not have the 8th bit set. Only the master ever sets the 8th bit. Slave controllers may not be allowed to address each other.

Figure 17:
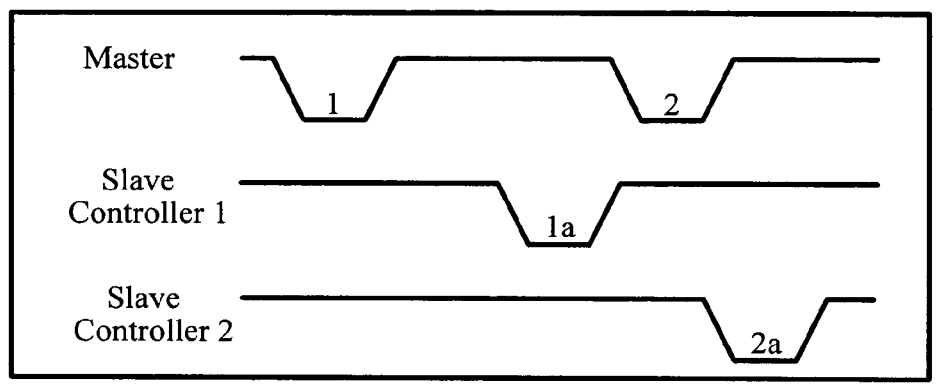
FIG. 17 are waveforms illustrating the master-slave controller communication sequence in accordance with an exemplary embodiment.

The master-slave controller communication sequence can be implemented using a "call and response" format where the master must initiate (call) all communication and the slave controllers must respond (response) to the master. The call and the response are communication packets. FIG. 17 shows the timing of the communication sequence. Note all communications from the master must have a parallel card response (Response, ACK, or NAK) or the master will consider it a bad communication.

An exemplary communication sequence proceeds as follows. First, the Master sends packet, addressing Slave controller 1 (8th bit set). Next, Slave controller 1 responds with data, acknowledged (ACK), or not acknowledged (NAK) packet. Slave controller 2 ignores the first packet since it is not addressed. The Master sends packet, addressing parallel card 2 (8th bit set). The Slave controller 2 responds with data, ACK, or NAK packet. Slave controller 1 ignores the second packet since it is not addressed.

Normally, a slave controller needs to respond to a master command within a set time window, e.g. 50 ms, after receiving the last byte of data. If the slave controller does not respond within this time window, the master will assume the slave controller is no longer connected or is broken in some way.

Figure 18:
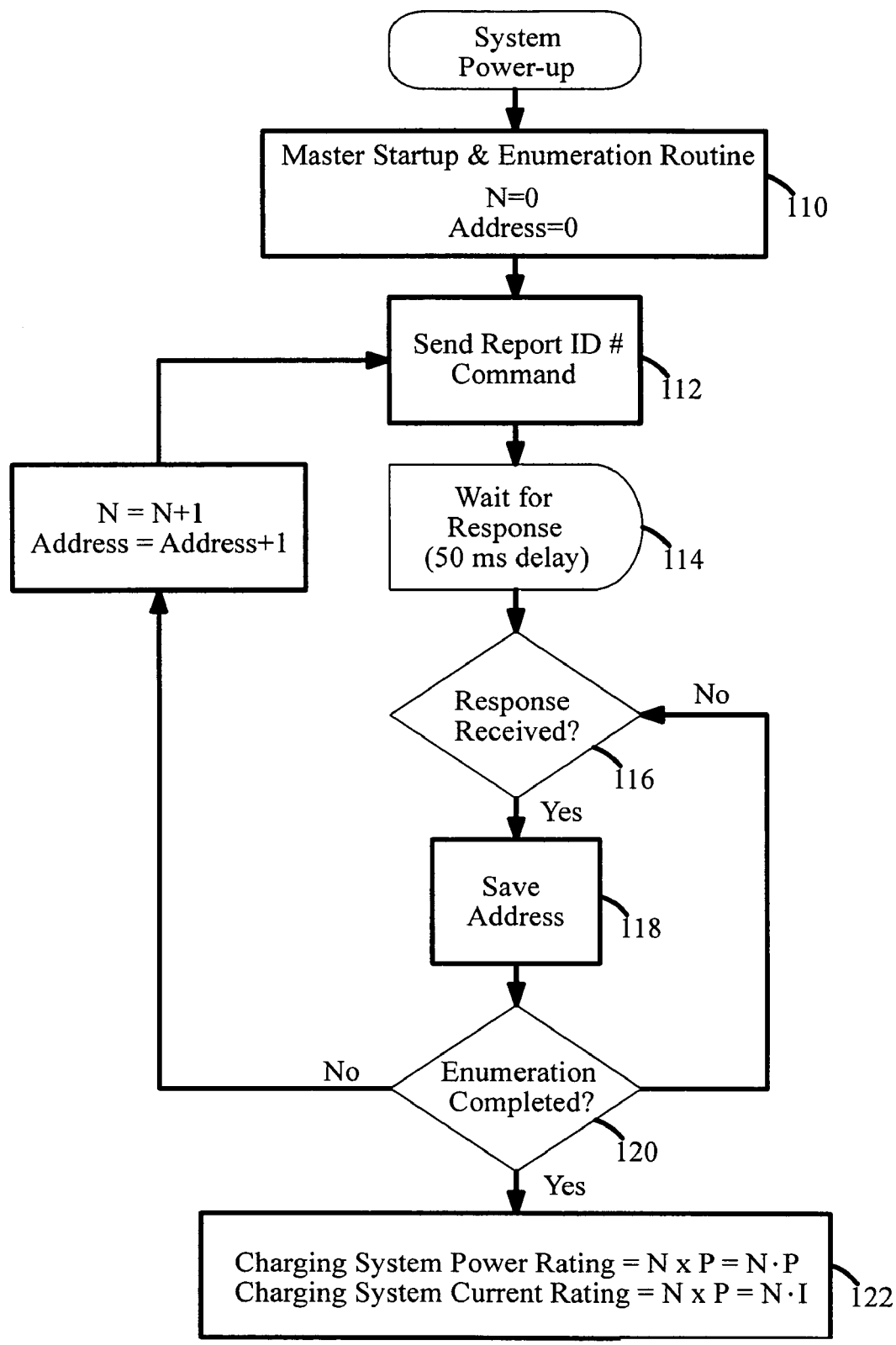
FIG. 18 is a flow chart illustrating the operation of the software in an exemplary embodiment to implement the start-up enumeration routine.

An exemplary embodiment incorporates an auto configuration capability. At startup, the master needs to find out how many parallel chargers are present. FIG. 18 illustrates operations in an Enumeration routine that allows the master to find out how many parallel base module chargers are connected and can communicate with the RS-485 bus to achieve this. After startup and initialization (at operation 110) the master performs Enumeration by sending a "Report ID#" command (at operation 112) across the RS-485 bus to all possible slave card addresses starting with 0 and waits for a response (operation 114). If a slave controller replies at operation 116, then it is enumerated and considered to be connected to the bus and its respective charging module is part of the overall charging system at operation 118. Any further queries to that slave controller provide a valid response.

If a slave controller is removed (disconnected) from the bus after it has been enumerated, any query to that slave controller causes a no response, which the master interprets as a bad connection or that the slave controller has failed. Therefore, the master preferably repeats the enumeration process anytime the configuration is changed. Anytime the master is powered down and then powered up or is reset, it enumerates all of the slave controllers that are currently connected to the bus. Because of this, all of the slave controllers are connected to the bus and powered up before the master performs the enumeration. If a slave controller that was enumerated stops sending information, the master continues to request information and sets a flag that tells the host that communication has been lost with a slave controller. This enables a slave controller to be re-connected to the system and allows the system to gracefully recover without a re-enumeration process.

Once the master enumerates connected slave controllers as determined at 120, the master can set the power and current ratings of the charging system at operation 122. For example, if the N slave controllers have been enumerated and the power and current ratings of their respective charging modules is P and I, respectively, then the overall charging system power and current ratings are set as:

Charging System Power Rating = N×P = N·P

Charging System Current Rating = N×I = N·I

The charging system can charge batteries with currents up to N·I and can deliver up to N·P of output power. If the system configuration changes from N to M, then the new power and current ratings of the charging system will be M·P and M·I, respectively.

One of the benefits of auto configuration is the redundancy that the modular charging system provides, which allows for minimal down time in case of a single or multi module failure. For example, if one of the charging modules 34 is switched off or disconnected for maintenance, the next time the system is recycled, one less slave controller will respond during the master's enumeration routine. For example, assuming a charging system that consists of three 10 kW, 48V/200 A modular chargers 34, if one of the parallel charging units 34 is disconnected, the master enumerates all slave controllers and, since it does not receive a notification from the disconnected controller, the master configures the charger as a 20 kW (48V/400 A) charging system. This configuration allows the charger to continue to operate, at lower power, providing continued service to end-users. The auto configuration can also be performed if one of the modular charging units reports a fault, in which case the master no longer considers that charger to be part of the overall charging system.

In controlling the overall charging system and implementing the charging algorithm, the master controller can send two types of commands: universal and individual. Universal commands are commands that the master sends to all of the slave controllers on the RS-485 bus at the same time. Individual commands are commands that the master sends to slave controllers one at a time. A list of typical commands that can be used is shown in Table 1.

TABLE 1

Table of commands in master-parallel card communication

| Command | Description |
| --- | --- |
| Universal Commands | |
| Synchronous Start Charge | All connected charging modules start charge cycle instantaneously |
| Synchronous Stop Charge | All connected charging modules stop charge cycle instantaneously |
| Synchronous Set Charge Parameters | Set charging parameters for all connected charging modules |
| Individual Commands | |
| Start Charge | Start charge cycle |
| Stop Charge | Stop charge cycle |
| Set Charge Parameters | Set charging parameters |
| Report ID # | Report ID # (address) |

Once command packets are sent from the master to the slave controllers, the slave controllers respond with a response, ACK, or NAK packet. The exceptions to this are the Universal commands. Because these commands access all of the slave controllers, no ACK is required (communication collisions would occur). As such, if the universal commands can be used to program all of the slave controllers after they are in the system, it is recommended that the individual "Report" commands are used to verify that all of the slave controllers are correctly programmed.

To ensure proper operation in case of communication fault, the system can be programmed to implement an auto shutoff protection, where the slave controllers deactivate their respective chargers in the absence of communications from the master. Once a slave controller is in the charge-state, it receives valid communication from the host on a regular basis (e.g. once every two seconds). If a slave controller does not receive a communication within the 2-second window, the slave controller disables its respective charging module. This reduces the possibility of the master losing control of the slaves.

In a further embodiment, a rapid charging system implements a multiport charging operation. Since the charging system has modular and independent power stages, each power stage can be utilized as a stand-alone charger. Each base power module 34 incorporates advanced microprocessor controls to communicate with the master controller, which is also capable of operating the unit in a stand-alone mode. As such, each base power module 34 can charge a battery on its own if a separate charging cable is provided.

Figure 19:
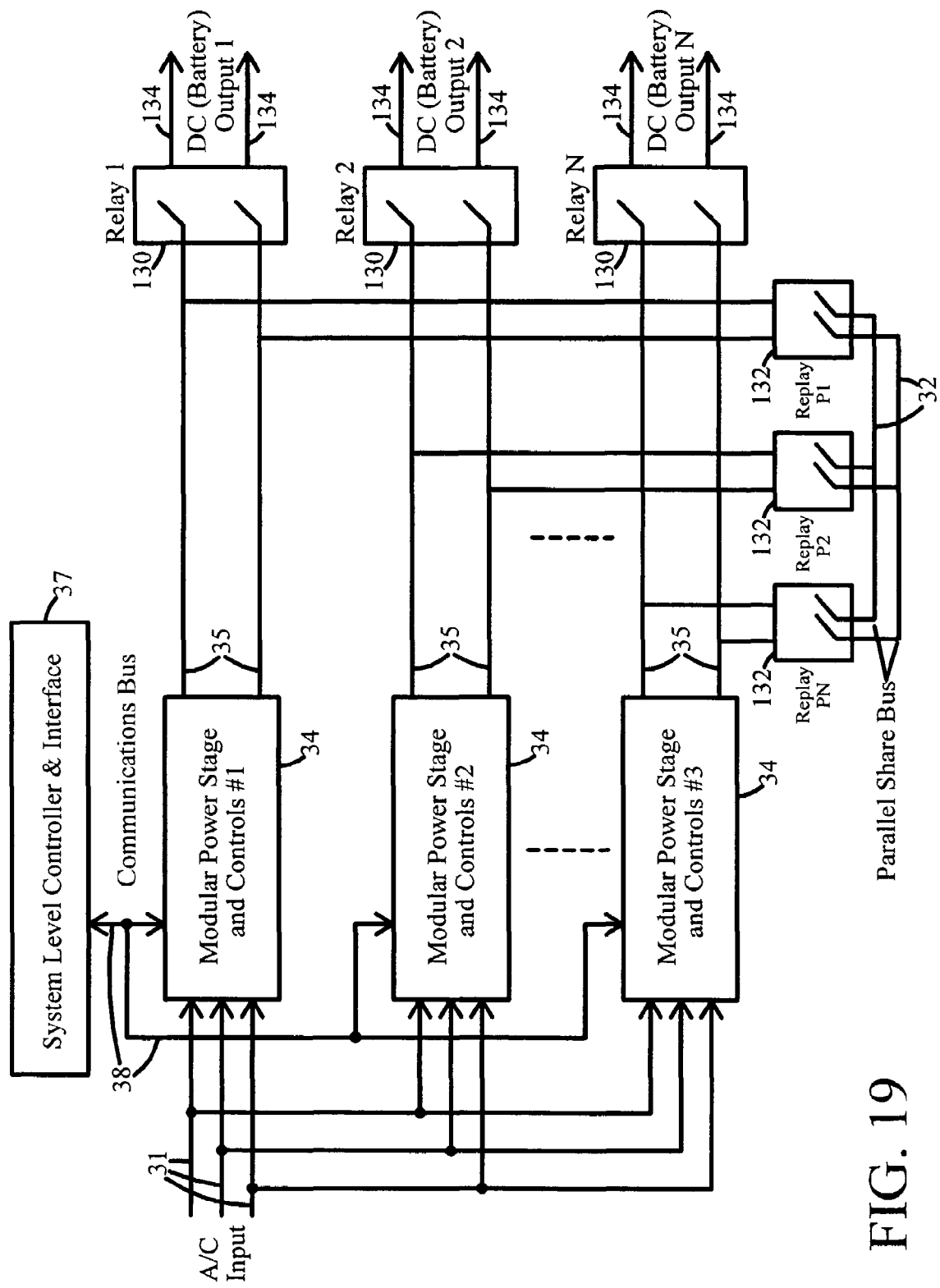
FIG. 19 is a block diagram of the multiport modular rapid charger system in accordance with an exemplary embodiment suited for configuring the modular base chargers into higher or lower powered charging systems.

The multiport rapid charger utilizes the basic property of having modular power stages 34 to turn them into independent chargers. By providing each of the power modules with separate charging cables, each module can charge a single battery independently. To reconfigure the modular chargers into higher power charging system, two sets of double pole, single throw relays 130 and 132 can be used as shown in FIG. 19. The first set of relays 130, referred to as the output relays, are used to connect the output terminals 35 of each module 34 to their respective batteries via cables 134, while the second set 132, referred to as the parallel relays, are used to interconnect all modules to a common parallel share bus 32. In addition, each output cable preferably is equipped with separate sensing leads or interlocking sensors to detect whether a battery is connected or not.

The system level controller 37 controls the state of the relays 130 and 132 and interfaces with each of the power modules to configure them as stand-alone or parallel chargers. In the preferred implementation of a multiport charging system, three exemplary configurations include: parallel, stand-alone, and semi-parallel operations.

If only one charging cable is connected to a battery, the master controller configures all chargers to run in parallel mode by closing the respective output relay for the unit where the battery is connected, and all parallel relays and then assuming control of the charging process. In this case, the overall charging system operates in a master-slave mode as described earlier. For example, assuming a three-module charging system with each rated at 48V/200 A, if only the output of the first module is connected to a battery, the master controller closes output Relay 1 to connect the battery to the first charging module as well as Relays P1, P2, and P3 to interconnect all charging modules in parallel resulting in a 600 A charging system. The master controller instructs the controllers of modules 1, 2 and 3 to run in slave mode where the master implements the charging algorithm. The master controller first closes all relays before the charging cycle starts, i.e., all relays are switched before charge is delivered to the battery.

If two or more charging modules' cables are connected to two or more batteries, the master controller may configure all charging modules to operate in stand-alone mode, where the output relays of all charging modules are closed and the parallel relays are left open. In this case, all charging modules are instructed to operate as masters. The master downloads the charge algorithms to the individual slave controllers and each slave controller operates as a stand-alone charger. The master acts as to relay that status of each individual charger to the display 59 or the serial interface. This mode allows more than one battery to be charged simultaneously at a rate governed by the maximum power/current rating of the individual charging modules. The drawback of this mode is that some modules are not be utilized when no batteries are connected to their outputs.

Semi-parallel operation is different than the stand-alone mode in that although more than one battery is connected, the master configures the charging system as a cluster of stand-alone and parallel chargers, depending of the needs of the connected batteries. For example, assuming a three module charging system with each module rated at 48V/200 A, if two batteries are connected to modules 1 and 2 with the battery connected to module 1 being the lowest discharged battery (having the lowest battery voltage), the master may configure the charging system to have charging units 1 and 3 in parallel, resulting in a 400 A charger, while leaving unit s as a stand-alone charger (200 A charger). The master controller closes output relays 1 and 2 and parallel relays 1 and 3 to interconnect units 1 and 3 in parallel. The master assumes control of the charging algorithm for battery 1, while unit 2 assumes control for charging battery 2.

In any of the above configurations, the master can be allowed to reconfigure the charging system when batteries are connected and disconnected. In such cases, the master instructs all charging modules 34 to stop the charging process, reconfigures the state of the relays, and resumes charging. For example, in the semi-parallel operation, if battery 2 is disconnected from the charging system, the master halts charging of battery 1, disable all chargers, opens output relay 2, and closes parallel relay 2 to reconfigure all charging units in parallel allowing 600 A of charging current to charge battery 1. The master can resume charging of battery 1. This ensures maximum utilization of the charging system.

Figure 20:
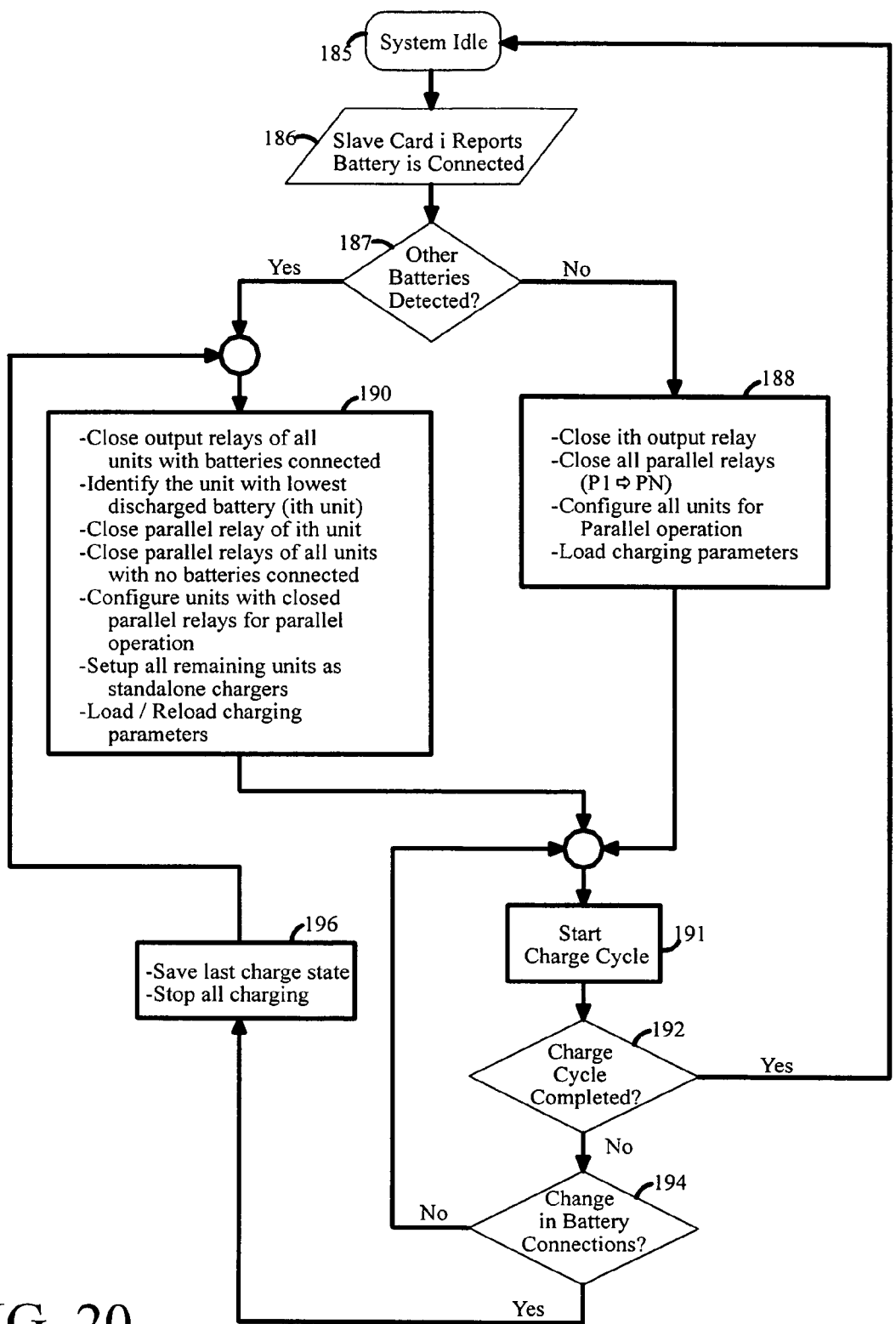
FIG. 20 is a flow chart illustrating the operation of the software in the controller of an exemplary embodiment for carrying out the multiport configuration routine.

FIG. 20 illustrates a block diagram of an exemplary multiport configuration routine. Additional, fewer, or different operations can be performed, depending on the embodiment. Beginning with the system idle at an operation 185, the slave card i reports that a battery is connected at an operation 186, and the program determines at an operation 187 whether other batteries are connected. If not, the system, at an operation 188, closes the ith output relay, closes all parallel relays, configures all units for parallel operation, and loads the charging parameters.

If other batteries are detected, the system at an operation 190 closes the output relays of all units with batteries connected, identifies the unit with the lowest discharge battery, closes the parallel relay of the ith unit, closes the parallel relays of all units with no batteries connected, configures the units with closed battery relays for parallel operation, sets up all remaining units as stand-alone chargers, and loads/reloads the charging parameters. The program continues on at an operation 191 to start the charging cycle. If the charging cycle is completed as determined at an operation 192, the system returns to idle at operation 185. If the charging cycle is not completed, the system determines if there is a change in battery connections at an operation 194 and, if not, starts the charging cycle at operation 191 again. If there is a change in battery connections, the system saves the last charge state and stops all charging at operation 196 and then returns to carry out the functions operation 190 and continues with the routine.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A battery charger that is modular and reconfigurable and provides flexible, multi-port rapid charging, and selectable output capabilities, the battery charger comprising:
   a base module providing DC power charging voltage, the base module including a power converter and providing output voltage for charging a battery, wherein each base module includes a transformer, an inverter, and a rectifier; and
   a master controller that interfaces with a plurality of the base modules to regulate power delivered by each base module to charge a battery, wherein at least two of the plurality of base modules can be connected in parallel and regulated to charge the same battery.

2. The battery charger of claim 1, wherein the base module further comprises a slave microprocessor controller with which the master controller communicates in a call and response communication format.

3. The battery charger of claim 2, wherein the slave microprocessor controller sets current and voltage commands based on communications from the master controller.

4. The battery charger of claim 2, wherein the master controller auto-configures current and power rating of the charger based on the number of base modules connected and detected.

5. The battery charger of claim 2, wherein the auto-configuration operation comprises an enumeration procedure that determines how many base modules are connected.

6. The batter charger of claim 1, wherein the inverter comprises a switch.

7. The battery charger of claim 1, wherein the inverter comprises four switches.

8. The battery charger of claim 1, wherein the inverter comprises a bridge topology selected from the group consisting of a half bridge and a full bridge.

9. The battery charger of claim 1, wherein the inverter comprises two switches.

10. The battery charger of claim 1, wherein the rectifier is selected from the group consisting of a full wave rectifier and a push-pull rectifier.

11. The battery charger of claim 1, further comprising a current mode controller for the base module, wherein the current mode controller regulates output current based on a command set from the master controller.

12. The battery charger of claim 11, further comprising a voltage mode controller for the base module, wherein the voltage mode controller regulates output voltage based on a command set from the master controller.

13. The battery charger of claim 12, further comprising a droop sharing control for the base module that ensures current sharing between the plurality of base modules.

14. A battery charging system comprising:
   a modular power stage configured to receive an alternating current (AC) input and provide a direct current (DC) output for charging a battery, the modular power stage comprising:
      an inverter coupled to a rectifier circuit, the inverter having as its input an input voltage, the rectifier circuit having as its output a battery charging voltage;
      an intermediate high frequency transformer intermediate the inverter and the rectifier to convert alternating current (AC) voltage from the inverter to a lower voltage input to the rectifier;

a current mode controller coupled to the output of the rectifier circuit and provides a current control signal for the modular power stage;

a voltage mode controller coupled to the output of the rectifier circuit and provides a voltage control signal for the modular power stage; and a droop sharing control that ensures current sharing between a plurality of modular power stages under constant voltage operation; and a system controller that interfaces with a plurality of the modular power stages and regulates power delivered by the plurality of modular power stages, wherein at least two of the plurality of modular power stages can be connected in parallel and regulated to charge the same battery.

15. The battery charging system of claim 14, wherein the switching circuit is controlled by a pulse width modulation (PWM) controller.

16. The battery charging system of claim 14 further comprising relays coupled to the output of the plurality of modular power stages to control output thereof.

17. The battery charging system of claim 14 wherein the system controller configures the plurality of modular power stages depending on battery charging needs.

18. The battery charger of claim 13, wherein current sharing includes utilizing a highest current technique.

19. The battery charger of claim 13, wherein current sharing includes utilizing an average current technique.

20. The battery charger of claim 1, wherein the base module further comprises a relay to connect the at least two of the plurality of base modules in parallel.

21. A method for charging batteries using a plurality of modular battery chargers, the method comprising:

receiving an indication that a first battery is connected to a first base module;

if one or more batteries other than the first battery are connected to one or more base modules other than the first base module, performing the operations of:
  (a) closing output relays of all base modules with batteries connected;
  (b) identifying a base module with lowest discharged battery;
  (c) closing the parallel relay of the base module with the lowest discharged battery;
  (d) closing parallel relays of all base modules with no batteries connected;
  (e) configuring base modules with closed parallel relays for parallel operation;
  (f) setting up remaining base modules as stand alone chargers; and
  (g) loading charging parameters into the base modules;

if no other batteries other than the first battery are detected as connected to one or more base modules, performing the operations of:
  (a) closing an output relay of a base module with lowest discharged battery;
  (b) closing all parallel relays to the base modules;
  (c) configuring the base modules for parallel operation; and
  (d) loading charging operations into the base modules;

starting a charging cycle.

22. The method of claim 21, wherein if a change in battery connections is detected before a charge cycle is completed, saving a last charge state and stopping charging.

* * * * *